United States Patent [19]

Banda

[11] 4,326,776
[45] Apr. 27, 1982

[54] MATRIX ELECTRODE CONSTRUCTION

[75] Inventor: Shunji Banda, Suwa, Japan

[73] Assignee: Kabushiki Kaisha Suwa Seikosha, Tokyo, Japan

[21] Appl. No.: 42,278

[22] Filed: May 24, 1979

[30] Foreign Application Priority Data

May 24, 1978 [JP] Japan ................................. 53-61986

[51] Int. Cl.$^3$ .............................................. G02F 1/133
[52] U.S. Cl. ................................... 350/336; 350/334; 350/333; 340/784
[58] Field of Search ....................... 350/336, 334, 333; 340/784

[56] References Cited

FOREIGN PATENT DOCUMENTS 2829602 2/1979 Fed. Rep. of Germany ...... 350/336
1425263 2/1976 United Kingdom ................. 350/336

*Primary Examiner*—Edward S. Bauer
*Attorney, Agent, or Firm*—Blum, Kaplan, Friedman, Silberman and Beran

[57] ABSTRACT

In the construction of an electrode matrix having m·n columns and rows for use, for example, with a liquid crystal display, the number of data electrodes to which independent signals are applied is Nn and the number of scanning electrodes to which independent signals are applied is m/N, N being the interval between elemental cell electrodes connected along the same data electrode. The data electrodes are formed on a baseplate with a layer of insulation covering the data electrodes. Elemental cell electrodes are formed on the insulating layer, and a limited number of openings through the insulating layer allow for an electrical connection between selected cell electrodes and the adjacent data electrode. Scanning electrodes may be formed on the insulating layer and/or on a facing baseplate. Two baseplates are in opposition to form a completed m·n matrix. Data electrodes on opposite plates overlap in the plan view, and a close spacing of individually controlled cell electrodes is achieved.

15 Claims, 10 Drawing Figures

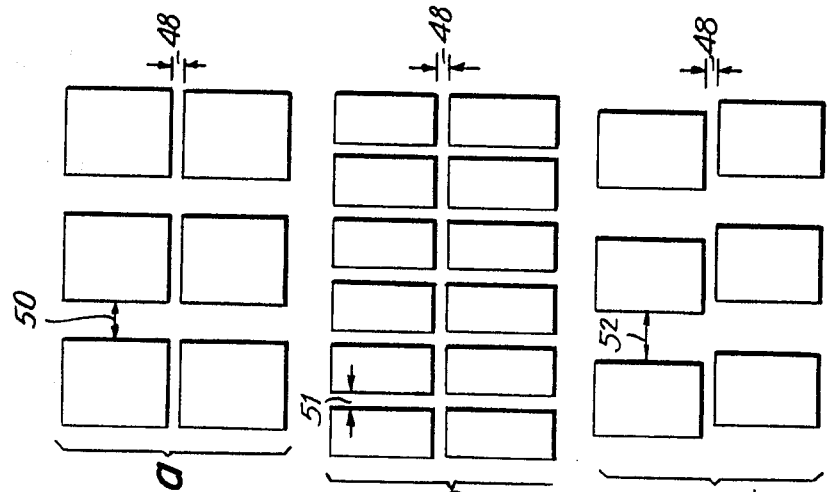
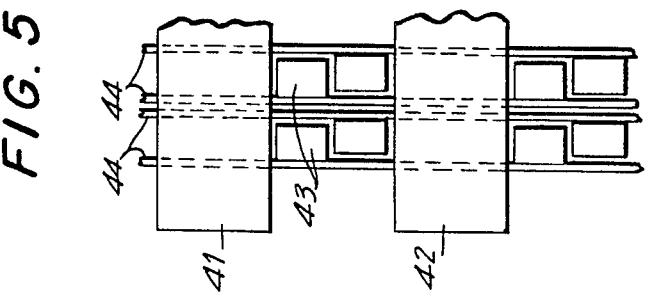
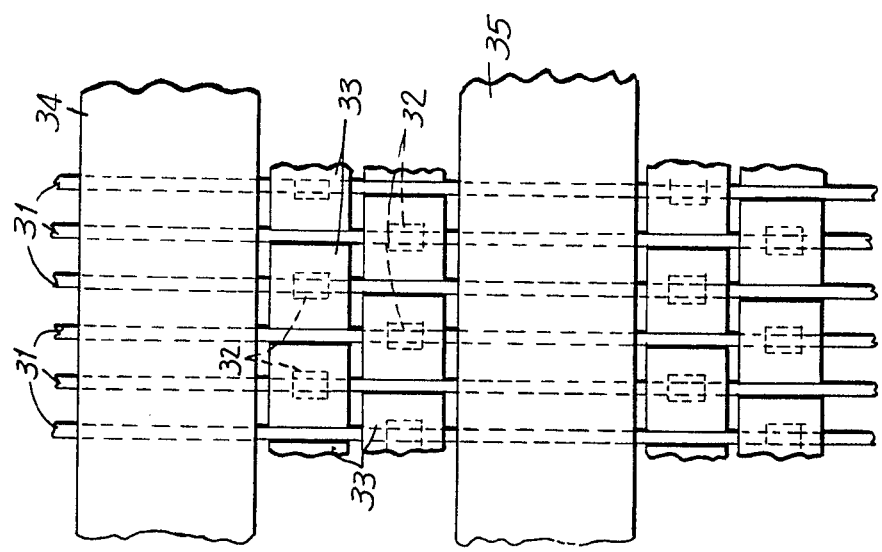

MATRIX ELECTRODE CONSTRUCTION

BACKGROUND OF THE INVENTION

This invention relates generally to an electrode matrix of the type used, for example, with liquid crystal television display panels, and more particularly, to a matrix electrode construction where the ratio of elemental cell electrode area relative to the gap area between the cell electrodes is increased. The cell electrodes are individually addressable. In one type of liquid crystal display system, a plurality of individual cell electrodes are arranged in a matrix of rows and columns, and a liquid crystal material is placed between opposed electrode arrays. When no voltage is applied across opposed electrodes, the liquid crystal material is clear and transparent. When a voltage is applied beyond a threshold level, the liquid crystal material takes on a frosted appearance which scatters the light. The degree of scattering depends on the amount of electrical potential across the electrodes; thus, gradations in the lighting level between cells is achieved. Thousands of individually controllable elemental liquid crystal cells may be used in a high-resolution display system. The quality of the display depends in a measure on how closely together individual display elements can be positioned. In the prior art, it has not been possible to eliminate the gaps between the elemental display cells.

What is needed is a matrix electrode constuction which allows for extremely close spacing of elemental cell electrodes while providing the capability to individually address each cell electrode.

SUMMARY OF THE INVENTION

Generally speaking, in accordance with the invention, an electrode matrix construction especially suitable for high-quality display resulting from minimized gaps between display element electrodes is provided. In the construction of an electrode matrix of this invention having m·n columns and rows, the number of data electrodes to which independent signals are applied is Nn, and the number of scanning electrodes to which independent signals are applied is m/N, N being the interval between elemental cell electrodes connected along the same data electrodes. The data electrodes are formed on a baseplate with a layer of insulation covering the data electrodes. Elemental cell electrodes are formed on the insulating layer, and a limited number of openings through the insulation layer allow for an electrical connection between selected cell electrodes and the adjacent data electrode. Scanning electrodes may be formed on the insulating layer or on a facing baseplate. Two baseplates are in opposition to form a completed m·n matrix. A close spacing of individually controlled cell electrodes is achieved.

Accordingly, it is an object of this invention to provide an improved matrix electrode construction providing a display of high definition.

Another object of this invention is to provide an improved matrix electrode construction wherein the ratio of electrode area to gap area is high.

A further object of this invention is to provide an improved matrix electrode construction which allows for the formation of elemental cell electrodes and scanning electrodes in one operation.

Yet another object of this invention is to provide an improved matrix electrode construction with opposed baseplates and half of the electrodes in the matrix on each baseplate.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3b is a view taken along line b—b of FIG. 3a;

FIG. 3c is a view taken along line c—c of FIG. 3a;

FIG. 4 is a partial plan view of an alternative embodiment of a matrix electrode construction according to this invention;

FIG. 5 is a partial plan view of a an alternative construction of a matrix electrode;

FIGS. 6a, b, c show plan views of electrode patterns for matrix constructions of this invention and the prior art.

DESCRIPTION OF THE PREFERRED EMBODIMENTS

Figure 2:
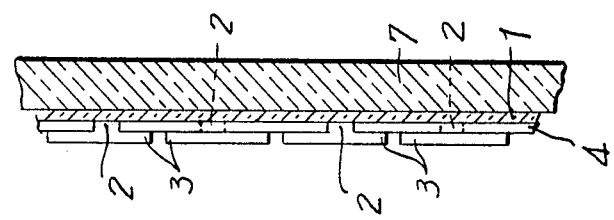
FIG. 2 is a sectional view taken along line 2—2 of FIG. 1.
Figure 1:
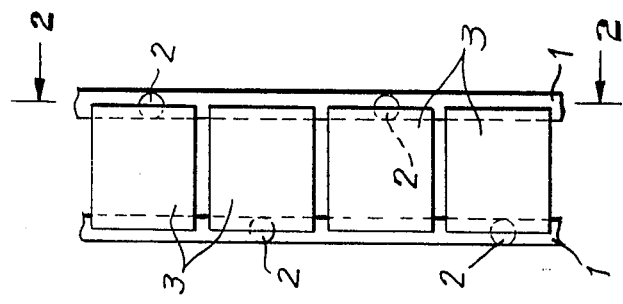
FIG. 1 is a partial plan view of an electrode construction in accordance with this invention.

The invention is described below for convenience and understanding as applied to a liquid crystal display device. A fundamental construction of this invention is shown in FIGS. 1 and 2 comprising a baseplate 7 having a plurality of data or lead electrodes 1 formed thereon. An insulating layer 4 covers the lead electrodes 1 and elemental cell electrodes 3 are formed on top of the insulating layer 4. The data electrodes 1 are narrow and elongated relative to the generally square shape of elemental cell electrodes 3, and the elemental cell electrodes 3 are arranged in a vertical row and only overlap the data electrodes 1 along the vertical edges (FIG. 1). The insulating layer 4 separates the data electrodes 1 from the cell electrodes 3 except for a plurality of openings 2 through the insulating layer 4. At these openings 2, the elemental cell electrodes 3 extend down and make electrical contact with the data electrodes 1. In the embodiment of FIG. 1, the holes 2 occur along the length of the data electrodes 1 at intervals such that every other elemental cell electrode in each vertical row is in electrical contact with the same data electrode 1. The interval in connecting the elemetal cell electrodes 3 to the data electrodes 1 is defined herein as N, and in FIG. 1, N=2. Accordingly, two data electrodes 1 are required to service the four elemental cell electrodes 3 of FIG. 1 when the interval N equals 2. When a potential is applied to a data electrode 1, that potential appears on every connected elemental cell electrode 3 associated with that same data electrode. Each elemental cell electrode 3 is connected electrically with a lead electrode 1 via an opening 2 in the insulating layer 4.

Figure 3C:
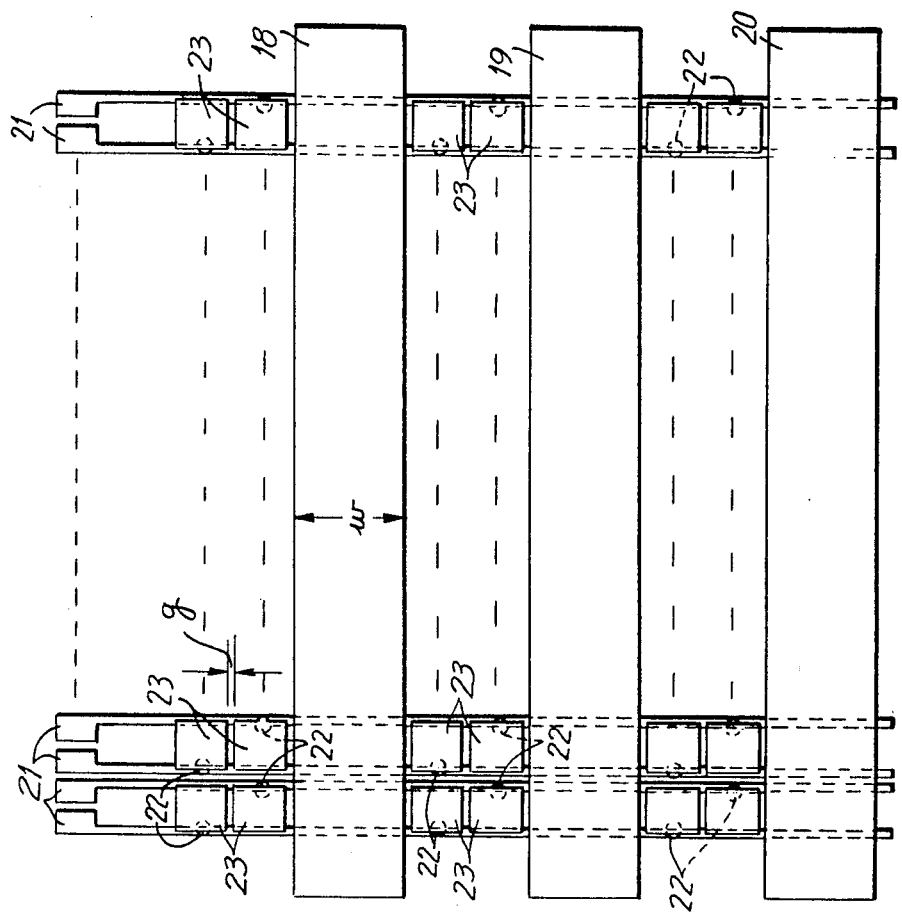
Figure 3B:
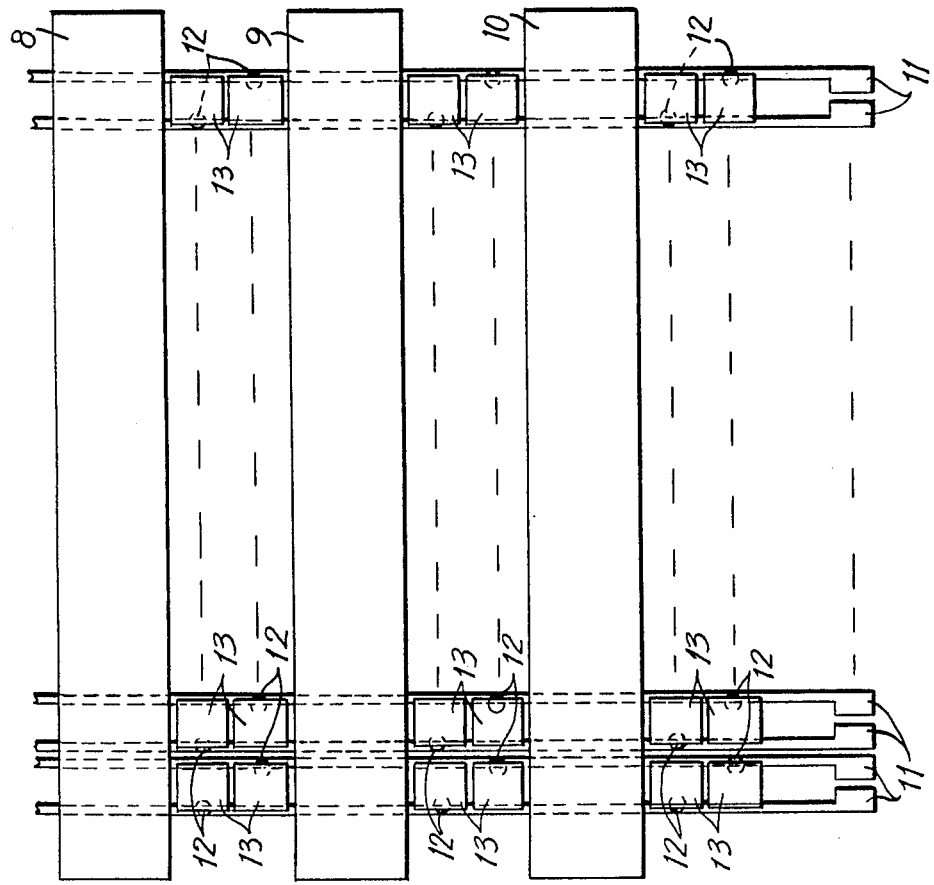
Figure 3A:
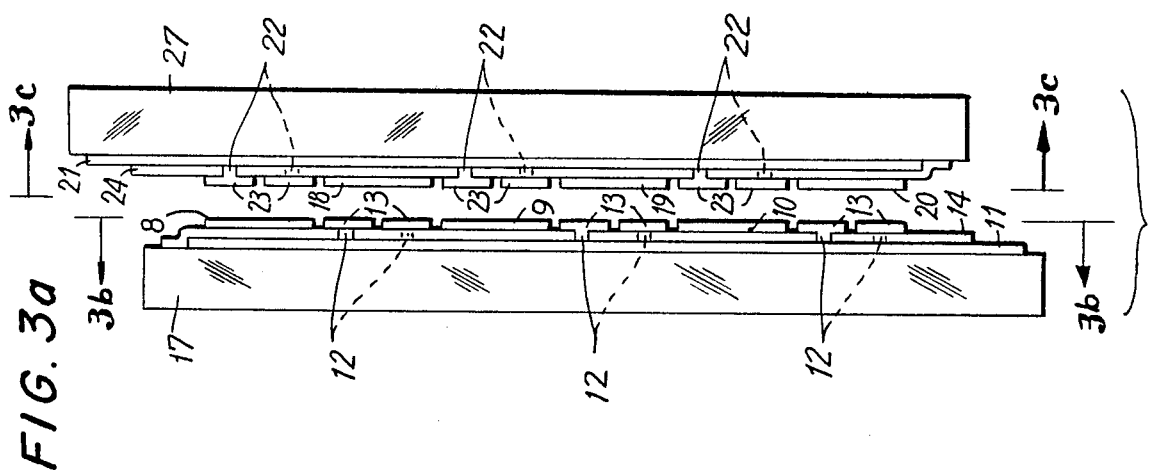
FIG. 3a is a side elevational view of a matrix electrode construction of this invention using opposed baseplates.

FIG. 3 illustrates an embodiment of this invention wherein a 12×12 matrix of elemental cells 13 is employed, and N is 4. That is, one data electrode 21 connects to every fourth elemental cell electrode 23 in a vertical row in the matrix. As best seen in FIG. 3a, the matrix electrode is comprised of two similar opposed plates which in combination comprise the entire 12×12 matrix construction of this invention. As illustrated in FIGS. 3b and c, the baseplates are substantially similar; therefore, the baseplate of FIG. 3c will be described, recognizing that the baseplate of FIG. 3b is similar in its construction and operation. Please note that the least significant digit in the reference numerals of FIGS. 1 through 3 is the same for corresponding components.

The matrix element of FIG. 3c is comprised of 24 data electrodes 21 and three transverse scanning electrodes 18, 19, 20. Elemental cell electrodes 23 are spaced in vertical rows proximate each other except that no elemental cell electrodes 23 are present in the space occupied by the scanning electrodes 18, 19, 20. Both the elemental cell electrodes 23 and the scanning electrodes rest upon the insulating layer 24. The width w of the scanning electrode equals the height of two elemental cell electrodes 23 having a vertical gap g between them. Accordingly, the elemental cell electrodes 23 in a single vertical row appear in spaced-apart pairs and one data electrode 21 connects to every other elemental cell electrode 23 by means of an opening 22 through the insulating layer 24 in the same manner as described above in relation to FIGS. 1 and 2. As will be apparent from the description which follows, each data electrode 21 connects electrically to every fourth elemental cell electrode 23 as seen in a completed matrix electrode construction of this invention. Therefore, as stated above, N is 4.

To form a completed 12×12 matrix, the two baseplates are mounted, by means not shown, such that the scanning electrodes 8, 9, 10 of the baseplate of FIG. 3b opposed elemental cell electrodes 23 on the baseplate of FIG. 3c. Conversely, the scanning electrodes 18, 19, 20 of the baseplate shown in FIG. 3c oppose elemental cell electrodes 13 on the baseplate of FIG. 3b.

It will be understood that when the baseplates 17, 27, insulating layers 14, 24, and scanning electrodes 8, 9, 10, 18, 19, 20 are transparent, a plan view of the opposed baseplates with their electrodes will show the completed 12×12 matrix having 144 elemental cell electrodes arranged in a uniform pattern with uniform gaps between them. Further, if the space between the baseplates 17, 27 is filled with a liquid crystal material and the elemental cell electrodes 13, 23 are also transparent, a 12×12 visible display can be provided in the known manner by the application of driving potentials to the elemental cell electrodes and to the corresponding opposed scanning electrode. The details of this operation do not form a novel part of this invention and are not discussed in further detail herein. Note that the elemental cell electrodes 13, 23 are all of identical size and vertically aligned one over the other without lateral displacement. In use, the same scanning signal would be applied to adjacent scanning electrodes, that is, the same scanning signal would be applied to scanning electrodes 8 and 18, and the scanning signals applied to scanning electrodes 9 and 10 are applied to scanning electrodes 19 and 20, respectively.

It should be understood that although the openings 2, 12, 22 through the insulating layers have been shown in the Figures as being round, the shape of these openings is not so limited and may, for example, be square, triangular, etc.

FIG. 4 illustrates an alternative embodiment of this invention and shows the electrode construction formed on one baseplate. It should be understood that for a complete electrode matrix there would be two similar opposed baseplates, as described above. The data electrodes 31 are illustrated running vertically, and the elemental cell electrodes 33 are centered over the data electrodes 31, whereas in the embodiment discussed above, the elemental cell electrodes overlap the data electrodes only at the edges. The openings 32 through the insulating layer, which is not visible in the plan view of FIG. 4, are square and connect the center of the elemental cell electrodes 33 to the data electrodes 31. The transverse scanning electrodes 34, 35 are spaced vertically (FIG. 4) between vertical pairs of elemental cell electrodes 33, and every cell electrode 33 connected to the same data electrode 31 is separated by a distance equaling three cell electrodes 33 and the gaps between them. Thus, the interval between elemental cell electrodes 33 on the same data electrode 31 is four, that is, N=4. In this embodiment, the elemental cell electrodes 33 are staggered relative to each other in the vertical direction, whereas in the embodiment of FIG. 3, the elemental cell electrodes 13, 23 were in line vertically. In the transverse direction, there is no gap between elemental cell electrodes 33 except the gap corresponding to the width of the data electrode 31. Accordingly, the ratio of cell area to gap area is maximized. On the opposing baseplate (not shown), the elemental cell electrodes are positioned opposite to the scanning electrodes of the baseplate illustrated in FIG. 4, and the data electrodes of both plates may be disposed one upon the other, as seen in the plan view.

In the above embodiments, a half of the necessary scanning electrodes and signal electrodes is arranged on each baseplate for reasons as follows. For example, in a display device of the twisted nematic type, it is better when the electrodes are transparent. However, in order to reduce the impedance of the data signal electrodes, there are instances where the data electrodes, and only those electrodes, are made of metal. Metal electrodes reduce the transparency of the display device. If all of the data signal electrodes are formed on the same baseplate, then the number of data electrodes on that plate is increased and the transparent portion is reduced. But, if the data signal electrodes are divided between two opposed plates and the data signal electrodes are disposed one upon the other, as seen in the plan view, the number of lead electrodes exposed to the viewer is half and there is more transparent area available in the display device. Additionally, dividing the electrodes between two baseplates in the instant invention provides some additional advantages such that the electrode pattern is more easily formed and the elemental cells are made small.

In the above-described embodiments, the scanning electrodes are formed on the baseplates at intervals of two rows of cells. It should be understood that in alternative embodiments of this invention, it is possible to provide scanning electrodes at every other row of cells or at even greater spacings. Also, the description above relates to a portion of a pattern having a 12×12 matrix of elemental cells; however, it should be readily understood that as the number of rows and columns increases or decreases, the substance of this invention is entirely the same.

If an m·n matrix of elemental cells in accordance with the invention is provided, N=4 and the liquid crystal in the device is driven by an amplitude selective multiplexing method, the maximum ratio of the effective voltage in a selecting condition to that in a nonselecting condition is given as $$\sqrt{\frac{m + 2\sqrt{m}}{m - 2\sqrt{m}}}$$

Accordingly, the driving margin is the same as that of a conventional prior art matrix construction. In an amplitude selective multiplexing method, a region of liquid crystal material in registration with an elemental cell is rendered visually distinguishable when the net voltage across the region between the associated data electrode and facing scanning electrode exceeds a threshold voltage.

This invention is characterized in that the gap between elemental cells is reduced, namely, the ratio of cell area to gap area is increased. In this ratio, this invention is comparable with certain of the prior art, for example, a matrix construction which needs frame memories, such as when a television image is displayed. However, such art includes some functions which differ from the arrangement in accordance with this invention. (See, Japanese Patent Publication No. 19960/77.)

FIG. 5 illustrates example of a matrix having the same function in that the opposed scanning electrodes to which the same scanning signal is applied are not separated. In FIG. 5, the scanning electrodes 41, 42 are arranged to extend in a lateral direction between vertical pairs of cell electrodes. In this embodiment, an insulating layer, not visible in this Figure, is provided between the elemental cell electrodes and data electrodes on the one hand and the scanning electrodes 41, 42 on the other hand. However, this insulating layer is not located between the data electrode 44 and the elemental cell electrode 43. In this manner, the matrix (FIG. 5) is constructed differently from the embodiments of this invention described above. In FIG. 5, the elemental cell electrodes 43 and scanning electrodes are separately formed on the baseplate. Accordingly, it is necessary to perform the patterning of transparent electrodes two times. On the other hand, in the construction of this invention, it is sufficient to perform the transparent electrode patterning only once, because the elemental cell electrodes and the scanning electrodes are formed in one operation at the same time. Note that in FIG. 5, the elemental cell electrodes 43 in the same horizontal row are spaced apart by more than the width of two data electrodes 44. The data electrodes 44 make edge contact with elemental cells 43, and the vertical edges of the elemental cells 43 are displaced laterally from the facing vertical edges of the elemental cell electrodes 43 of the next adjacent lateral row of cell electrodes.

FIG. 6 illustrates three arrangements of elemental cells for display in examples where the data electrodes are made of metal and the width of the data electrodes, the pitch of elemental cells, and the vertical gap between electrodes are the same. FIGS. 6a and b illustrate arrangements in accordance with this invention, and FIG. 6c is an arrangement in accordance with the construction shown in FIG. 5. These drawings are enlarged views of elemental cell arrangements in examples where the width of the lead electrodes is 0.1 mm, the gap between electrodes is 0.1 mm and the pitch of elemental cells is 1 mm.

As seen in FIG. 6, the gaps 48 in the longitudinal or vertical direction are the same between each arrangement; however, as to the gap in the lateral direction, the gap 50 in FIG. 6a is 0.3 mm, and in FIG. 6b the lateral gap 51 is 0.2 mm for one pitch distance, and the gap 52 in the conventional prior art example of FIG. 6c is 0.4 mm. In the arrangements of this invention, there is no shear in cell arrangement; the cells are aligned one above the other vertically. Moreover, when the data electrodes are transparent, the gap is set at 0.1 mm. In this manner, according to this invention, the gap between elemental display cells is reduced. That is, the ratio of elemental cell area to gap area is increased. As a result, the display is improved in appearance. Also, in cases where the quantity of display cells is the same, a display using the construction of this invention is reduced in size from the construction of a prior art display.

In the embodiment shown in FIGS. 3 and 4, the scanning electrodes and data signal or lead electrodes are formed on the same baseplate; however, in an embodiment where the data electrodes are to be transparent, or in a case where the dynamic scattering effect of the liquid crystal is utilized, it is also possible to arrange the data signal electrodes entirely on one baseplate, with the scanning electrodes on the opposed baseplate.

This invention and the alternative embodiments of this invention are effective particularly for application to a television image display. Although, in embodiments of this invention, the data electrodes, the insulating layer, and elemental cell electrodes are formed in that order, the object of this invention can be achieved also by forming the elemental cell electrodes, the insulating layer and the data electrodes in reverse order.

As illustrated by the above embodiments, for a given value of N, i.e., interval between cell electrodes connected to the same data electrode, there are mathematical relationships which exist in rectangular matrices of the m·n type. In particular, the number of scanning electrodes driven by the same signal is m/N where m is the number of elemental cells in a matrix, arranged vertically as seen in the Figures. Thus, for FIG. 3, the number of scanning electrodes driven by the same signals for a pair of baseplates is 12/4=3.

The number of data electrodes required to allow individual address for each elemental cell electrode is Nn where n is the number of elemental cells in a matrix arranged laterally, as seen in the Figures. Thus, the number of data electrodes required in FIG. 3 for opposed baseplates is 48.

It will thus be seen that the objects set forth above, and those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:
1. A matrix display comprising:
a plurality of elemental cell electrodes defining an excitation region in a liquid crystal layer, said cell electrodes being arranged to form a matrix of rows and columns;

a plurality of narrow and elongated data electrodes for connecting together a given number of nonadjacent elemental cell electrodes in each row of cell electrodes;

an insulating layer between said cell electrodes and said data electrodes;

a plurality of openings through said insulating layer, each said opening exclusively associated with one cell electrode and exposing a portion of one data electrode to said one associated cell electrode, a connection being formed between said one data electrode said one associated cell electrode through said opening;

a plurality of scanning electrodes, each said scanning electrode opposing a portion of said elemental cell electrodes and spaced apart therefrom, each scanning electrode being located on the same surface of an insulating layer as approximately half of the cell electrodes and alternating with pairs of cell electrodes, the scanning electrodes forming column excitation electrodes;

a liquid crystal material, said liquid crystal material being positioned between said spaced apart cell electrodes and scanning electrodes, selective application of voltage of suitable level across said opposed scanning electrodes and elemental cell electrodes actuating the excitation region of said liquid crystal therebetween for display.

2. A matrix display as claimed in claim 1, wherein said rows and columns are mutually perpendicular.

3. A matrix display as claimed in claim 2, wherein said data electrodes are substantially parallel to said rows, each cell electrode in said rows being connected to one of said plurality of data electrodes.

4. A matrix display as claimed in claim 3, wherein in a plan view said matrix is arranged in rows and columns of cell electrodes, said data electrodes on said first baseplate overlap said data electrodes on said second baseplate, whereby said columns of cell electrodes may be more closely spaced.

5. An electrode matrix as claimed in claim 3, having transparent baseplates, cell electrodes, and insulating layers.

6. An electrode matrix as claimed in claim 3, wherein said data electrodes are metal.

7. An electrode matrix as claimed in claim 3, wherein said data electrode is transparent.

8. An electrode matrix as claimed in claim 3, wherein said data electrodes are formed on baseplates.

9. An electrode matrix as claimed in claim 3, wherein said openings expose an edge of said cell electrodes.

10. An electrode matrix as claimed in claim 3, wherein said openings expose a central region of said cell electrodes.

11. An electrode matrix as claimed in claim 9 or 10, wherein said cell electrodes are rectangular.

12. An electrode matrix as claimed in claim 3, wherein the number of said rows is at least two, and said longitudinal rows are spaced apart, the spacing between said rows being equal to the width of one of said data electrodes.

13. An electrode matrix as claimed in claim 12, wherein said cell electrodes are rectangular, and said spacing is a distance selected in the range of 1 to 3 mm.

14. An electrode matrix as claimed in claim 3, wherein at least one data electrode extends substantially the length of each said row and is in at least partial registration with said aligned cell electrodes of each said row, said openings in said insulating layer not exposing adjacent cell electrodes in the same row to the same data electrode, a signal on one said data electrode does not drive every cell electrode in a row of cell electrodes.

15. An electrode matrix construction as claimed in claim 3, wherein said matrix comprises an m·n matrix construction having n said longitudinal rows and m said cell electrodes in each said row, the interval of cell electrodes having a common data electrode being N, and the number of scanning electrodes and the number of data electrodes to which independent signals may be applied are m/N and Nn, respectively, whereby every cell electrode is independently addressable by driving said associated data electrode and said opposed scanning electrode concurrently.

* * * * *